US012514892B1

(12) United States Patent
Berry

(10) Patent No.: US 12,514,892 B1
(45) Date of Patent: Jan. 6, 2026

(54) **SCAR REVISIONS USING TOPICAL *HAMELIA PATENS* EXTRACT**

(71) Applicant: Don Wayne Berry, Georgetown, TX (US)

(72) Inventor: Don Wayne Berry, Georgetown, TX (US)

( * ) Notice: Subject to any disclaimer, the term of this patent is extended or adjusted under 35 U.S.C. 154(b) by 623 days.

(21) Appl. No.: 17/803,433

(22) Filed: Jul. 6, 2022

Related U.S. Application Data

(63) Continuation-in-part of application No. 16/602,156, filed on Aug. 15, 2019, now Pat. No. 11,458,183, which is a continuation-in-part of application No. 15/732,771, filed on Dec. 26, 2017, now Pat. No. 10,383,908.

(60) Provisional application No. 63/259,406, filed on Jul. 15, 2021, provisional application No. 62/498,672, filed on Jan. 3, 2017.

(51) Int. Cl.
*A61K 36/51* (2006.01)
*A61K 45/06* (2006.01)

(52) U.S. Cl.
CPC .............. *A61K 36/51* (2013.01); *A61K 45/06* (2013.01)

(58) Field of Classification Search
None
See application file for complete search history.

(56) References Cited

U.S. PATENT DOCUMENTS

| 8,652,534 | B2 | 2/2014 | Berry | 424/725 |
| 9,345,736 | B2 | 5/2016 | Berry | |
| 9,345,737 | B2 | 5/2016 | Berry | |
| 9,987,322 | B1 | 6/2018 | Berry | |
| 10,383,908 | B1 | 8/2019 | Berry | |

OTHER PUBLICATIONS

Monstrey (Journal of Plastic, Reconstructive, and Aesthetic Surgery (2014), vol. 67, pp. 1017-1025).*
pp. 144, 145; and 417-420 from "The Healing Power of Rainforest Herbs" SquareOne publishers, authored by Leslie Taylor. Jan. 1, 2005.

* cited by examiner

*Primary Examiner* — Susan Hoffman
(74) *Attorney, Agent, or Firm* — Chris Whewell

(57) ABSTRACT

Methods are provided for causing beneficial revision of scars present on the skin of a mammalian subject, including human subjects. A method according to the disclosure comprises contacting a scar with an extract of *Hamelia patens*, present in a dermatologically-acceptable carrier. Methods according to the disclosure are applicable to a plurality of scar types, including scars which themselves feature the characteristics of a plurality of scar types present at the same site.

17 Claims, No Drawings

SCAR REVISIONS USING TOPICAL *HAMELIA PATENS* EXTRACT

CROSS-REFERENCE TO RELATED APPLICATIONS

This application claims benefit to U.S. provisional Application No. 63/259,406 filed on Jul. 15, 2021. This application is a continuation-in-part of U.S. patent application Ser. No. 16/602,156 filed Aug. 15, 2019, now U.S. Pat. No. 11,458,183, which is a continuation-in-part of U.S. patent application Ser. No. 15/732,771, filed Dec. 26, 2017, (now U.S. Pat. No. 10,383,908, which claims benefit to U.S. provisional Application No. 62/498,672 filed on Jan. 3, 2017, and the entire contents of all of which are herein incorporated by reference.

TECHNICAL FIELD

This invention relates generally to scars on the skin of human subjects. It further relates to topical compositions comprising an extract of the plant species *Hamelia patens*, and the use of such compositions in treating human skin which has been exposed to traumas, wounds, lacerations, etc. which result in scar tissue forming in and on the dermis.

BACKGROUND

The statements in this background section merely provide background information related to the present disclosure and may not constitute prior art.

It is probably true that since the first time in history a person noticed a scar on their skin, that they desired to remove it somehow, and undoubtedly many oils or the like were tried for their scar-removing ability, to little or no avail. At present, various compositions and materials are known in the art, or advertised as being effective for "scar removal." According to one recent write-up in Consumer Review™ magazine, a good scar treatment should contain clinically-proven ingredients including medical grade silicone, onion bulb extract, aloe vera, allantoin and oils of emu, safflower, sunflower and jojoba.

Six types of common scars are known, including: 1) keloid scars; 2) contracture scars; 3) hypertrophic scars; 4) atrophic scars; 5) stretch marks; and 6) acne scars. Keloid scars are said to derive from excessive collagen production which occurs after a wound has healed, leading to overgrowth of tissue above normal skin level. Often, these are red-colored or purplish, and can fade over an extended period of time depending on the health status, nutrition, and genetics of the subject. The same may be said about other types of scars. Keloid scar tends to develop in skin areas associated with joints in areas of flexion.

Contracture scars typically result from an injury which causes tissue destruction, including burn wounds and joint injuries. Often, the tissue surrounding such damaged tissue will pull together, which can restrict movement.

Hypertrophic scars are those which appear generally red in color, on a wound in thick, raised clusters of discolored tissue. Hypertrophic scars typically increase in size, or widen with the passage of time. Some hypertrophied scars typically increase in size, and widen in time.

Atrophic scars are those which occur below the surface of the skin and present as a sunken appearance, below the normal skin surface. Atrophic scars are caused by rashes or illnesses, including chicken pox.

Atrophic scarring and hypertrophic scarring can simultaneously occur at the same site, as these both occur as a wound or scar attempts to heal beneath a secondary infection which may be present. Often, this results in un-evenness and differences in elevation across a scarred area of the skin.

The generation of scar tissue presents an issue, inasmuch as scars result from the body's attempt at healing itself. Once the body "believes" that a wound is healed by the scar tissue it generated, the body considers itself as being "done" with the healing operation, and the scar tissue remains and is not replaced by normal skin cells contiguous with the skin in areas adjacent to the wound or source of the scar tissue. However, some scars slowly improve with time. Owing to the sometimes un-sightliness of scarred skin, literally tens of thousands of skilled artisans in this field have put much effort into this topic of scar revision or removal, resulting in several methods or treatment modalities having been approved and accepted for clinical use around the world.

One medical treatment for scars is known as dermal abrasion, which as the name implies is akin to sanding a piece of wood with sandpaper, the objective being to scrape the top layer(s) of skin to reveal new healed skin beneath the material removed by Dermabrasion procedures. This method is generally favored for small scars.

Another treatment for scars involves the use of "chemical peels" in which a chemical solution, emulsion, etc. is applied to the skin to remove the top layer(s) of skin, under the theory that new skin which replaces that which was lost will be smoother or more visually appealing than the layer(s) removed. Chemical peels are among the most-popular modalities for removing scar tissue, but their use is limited.

Laser resurfacing is another option which is approved for reducing the appearance of scars, including acne scars. Basically, focused light energy is impinged on the target area to remove the top layer of the dermis, whereby the new skin which replaces that which was ablated is of better appearance. Laser light has also been used to induce dermal collagen production, which is most likely in accordance with the known principles of mitogenic radiation.

Various injections are also approved for treating the appearance of scars, including dermal fillers including BOTOX™ treatments, injections of corticosteroids to break down collagen fibers, and collagen injections for temporarily filling depressed areas with collagen.

Moreover, those of ordinary skill in the art are aware of the surgical techniques of cryosurgery, punch grafts, and the surgical revision of scar tissue. In some instances, radiation therapy is employed.

It is recognized in the art that the identification of the type of scar is important when considering the most prudent treatment modality. In view of the foregoing, it is clear that the treatment of scars on the skin of human subjects is not a simple matter. Moreover, while often the results of the various treatments are successful in making improvements, it is somewhat of a rare situation in which an existing scar is completely removed from the skin and replaced with normal tissue. Because there is much understanding in the healing of burn scars that is not fully known, burn scars need to be scientifically studied and the healing process thoroughly defined in order to predict the future of which scars will progress to more scar, remain the same, or gradually improve with time.

SUMMARY

Provided are compositions comprising an extract of the plant *Hamelia patens* and methods of using the provided compositions in topical application to existing scars and scar tissue present on the skin of a human subject. The methods result in observable a drastic reduction of the negative or unsightly appearance of scar tissue, and in some instances a complete or nearly-complete erasure of the existence of the entire scar. In some embodiments, the *Hamelia patens* extract is provided in combination with a dermatologically-acceptable carrier.

DETAILED DESCRIPTION

During my earlier investigations, it was learned that no effective topical medicament had been previously known as being capable of inducing formation of granulation tissue in third-degree burns on human skin, as described in U.S. Pat. No. 10,383,908. Part of that disclosure concerned granulation tissue in third-degree burn wounds, with a healing resulting in the affected areas being flat, without keloid or scar formation. Taking the investigation further, it has now been discovered that the extracts of the plant *Hamelia patens* plant can be topically applied to the surface of a variety of newer (less-than one year old) and older (at least one year old) existing scars on human subjects, with astonishing and sometimes seemingly-miraculous results. This is believed a significant advance, given the listing in the Background Section above of accepted treatment modalities for alleviating the negative appearances of scars on people, which require far more effort than the present teachings and which yield generally inferior results.

Depending on the size of a given scar and its location on the body, scars can have a significant impact on a person's emotional and social well-being. Thus, by elimination of the appearance of any scar according to embodiments outlined herein, there is exerted not only a physical benefit to a human subject, but also these emotional and social aspects for the subject. The disclosures presented herein are not only important to the visual appearance in the case of skin scars. This is because scars are frequently associated with one or more than one of: sensitivity, swelling, contour irregularities, cardiac and pulmonary complications, deep vein thrombosis, persistent pain, and even problems with vision, speech, and feeding. Thus, the benefits of the disclosure go far beyond remedies for one's physical appearance. That is, when a scar which exists say, near the eyes, is removed and vision is improved, such a result could not be foreseeable in view of the prior art, when endeavoring to treat a scar by any of the known conventional modalities.

Importantly, the teachings herein are of special significance for persons having darker skin types, because of the tendency of the skin of those having darker skin types towards either hyper-pigmentation or hypo-pigmentation in the scar or adjacent skin areas which develops as a result of the healing process.

This disclosure concerns the plant known as *Hamelia patens*, its parts, and extracts or extract concentrates prepared therefrom, constituents thereof, and their topical use in treating and beneficially revising the appearance of scars on human skin. *Hamelia patens* is a perennial shrub or shrub-like plant that is sometimes referred to as Scarlet Bush, Firebush, and Texas Firecracker, among other common names. *Hamelia patens* grows in Florida, Texas, and other southern and southwestern states, and is also distributed throughout parts of Mexico and Central and South America.

An extract provided in accordance with this disclosure is produced using any combination of parts of the *Hamelia patens* plant, or any of its sub-species, which parts are selected from the group consisting of: its roots, stems, leaves, and fruit. In some embodiments, only the leaves are employed in preparing the extract.

A *Hamelia patens* extract in some embodiments is provided by first picking leaves from a sub-species of the plant, the sub-species in some non-limiting embodiments being *Hamelia patens* jacq. In one exemplary embodiment about 509 grams of freshly-picked leaves of *Hamelia patens* jacq. were procured from *Hamelia patens* jacq. grown in Texas. Stems were removed from the leaves and the leafy material was cut transversely into strips. The cut leafy material was combined with about 475 milliliters of CETAPHIL® gentle skin cleanser (Galderma Laboratories) in a covered one-liter beaker and blended using a stirring rod until the leafy material was evenly distributed throughout the bulk of the composition. The contents of the beaker were heated to 65.5 degrees Centigrade for 30 minutes with frequent stirring. During the course of the heating the leaves turned to a dull green with a brown cast. At the end of the 30 minutes the leafy material was compacted using a potato masher, to squeeze more of the plant-borne matter from the leaves and into the bulk of the composition. Finally, the beaker's contents were poured through a stainless steel screen, of sufficient mesh to separate the solid matter including leaves from the liquid portion, which liquid portion itself was subsequently strained through cheesecloth, thus providing a liquid *Hamelia patens* extract suitable for topical application to a scar on human skin, to revise the appearance and sometimes eradicate the very existence of a scar. As used herein, "human skin" includes any skin located on any part of the body of a human subject.

In other embodiments useful for providing a *Hamelia patens* extract, a protic solvent such as water, or a lower alcohol (any C2-C4 alcohol), or a mixture comprising a plurality of lower alcohols, or blends comprising one or a plurality of lower alcohols and water, when miscible, in any relative proportions, is employed as a liquid solvent into which the constituents of *Hamelia patens* are extracted from the plant. In some embodiments the lower alcohol is any alcohol selected from any C2-C4 alcohol, including any mixtures thereof, independently selected to be present in any desired proportion. In some embodiments a water/alcohol mixture containing any amount in the range from about 5% to about 10% by volume of the alcohol in water is used as a solvent. In other embodiments a water/alcohol mixture containing any amount in the range from about 10% to about 50% by volume of the alcohol in water is used as a solvent.

Various extraction techniques known in the art may be employed, including percolation, soxhlet extraction, and other extraction techniques, including those employing supercritical carbon dioxide. In an illustrative embodiment, about 500 grams of dried *Hamelia patens* leaves ground to a coarse powder are combined with about 500 ml of a mixture that is 10% by volume of ethanol and 90% by volume of water, in a suitable vessel and heated to about 65 degrees Centigrade for 30 minutes. In alternate embodiments, the solvent is maintained at room temperature and the mixture of plant matter and solvent is permitted to steep for an extended time, of 24 hours. In other embodiments, a longer extraction time of any selected time in the range of between about 24 hours and about 72 hours is employed. The resulting solution from such heating, percolation, or other extraction technique is filtered and optionally centrifuged to provide a liquid solution *Hamelia patens* extract. This solution extract in some embodiments can be applied as-is to a scar on human skin to improve the appearance of the scar or effect its complete or near-complete replacement with normal skin tissue. In alternate embodiments various other materials may be combined with such solution extract to form skin creams, lotions, salves, ointments, etc., as described below prior to its application to human skin to revise the appearance of, or effect total or near-total replacement of the scar with normal skin tissue.

In some embodiments, the solvent present in such a liquid solution extract is removed using techniques known to those skilled in the art (including reduced pressure distillation, flash evaporation, a rotary evaporator, nitrogen sweep, etc.) to yield an extract in the form of a dry powder, crystalline, amorphous, or other solid, or semi-solid form. In some embodiments, the temperature of the liquid solvent extract is not permitted to exceed about 50 degrees Centigrade during solvent removal. In one embodiment when a solvent comprising 10% by volume ethanol in 90% by volume water is employed at room temperature in a percolation or steeping lasting about 24 hours, the yield of dry *Hamelia patens* extract provided following solvent removal amounts to about 7% by weight based on the weight of the fresh-cut *Hamelia patens* leaves employed. Typically by such processing the yield of *Hamelia patens* extract ranges from between about 2% to about 8% by weight based on the weight of the plant matter used, based on the contents of the plant material used. While an extract of the *Hamelia patens* plant is in some embodiments crystalline in nature, it is understood by those skilled in the art that extracts of the plant *Hamelia patens* obtained following solvent removal may not always be perfectly crystalline or powdered crystalline in nature owing to variation among individual plants' growing condition, time of harvest, and genetics, which can impact the quantity of polymeric and other residues present or other aspects of composition which affect crystallinity. Thus, in some embodiments a non-completely-crystalline residue or extract may be obtained from an extraction of a *Hamelia patens* plant, such as extracts comprised of or which include amorphous or partially-gummy residues or components; however in general such non-completely crystalline extracts obtained are viewed as being equivalent to a crystalline extract for purposes of this disclosure and these forms are all to be treated herein as being included in the term *Hamelia patens* extract where the context does not otherwise exclude non-crystalline or gummy or other residues or components. Thus, the words "*Hamelia patens* extract" refers to crystalline, semi-crystalline, amorphous, and any other physically observable form of the material which results from an extraction of the *Hamelia patens* plant that is free from the solvent that was used to extract it from the plant matter. A *Hamelia patens* extract when specified herein can be the material obtained from *Hamelia patens* when the plant is extracted with either water, or other solvents including aqueous alcoholic solvents, and can be mixtures of extracts obtained using different selected solvents. In some embodiments the *Hamelia patens* extract is selected to be an aqueous extract, i.e., produced as a result of the plant matter being extracted with water. In other embodiments the *Hamelia patens* extract is selected to be an aqueous alcohol extract. In some embodiments the *Hamelia patens* extract is mixture of extracts from both aqueous and aqueous alcoholic, or alcoholic extracts in any desired or selected proportion.

Compositions according to some embodiments of the disclosure are prepared by mixing a *Hamelia patens* extract with various other materials, as desired, such other materials collectively comprising a dermatologically-acceptable carrier. In some embodiments the crystalline *Hamelia patens* extract is ground with a mortar or otherwise pulverized, or liquefied by addition of any selected suitable solvent, and combined with or formulated into a skin crème or skin lotion, salve, etc. at any desired concentration, to provide a medicament suitable for topical application to human skin in which the concentration of *Hamelia patens* extract is preselected to be any concentration between 0.05% by weight and 85.00% by weight based on the weight of the final medicament composition, including all weight percentages and ranges of weight percentages therebetween. In some embodiments, the exact concentration selected is at the discretion of a physician, as it is sometimes desirable to adjust concentrations and topical application frequency to suit the unique needs of a particular patient.

In some embodiments a crystalline *Hamelia patens* extract is blended with at least one other material that is a solid or liquid at room temperature, in any suitable or desired amount, in order to provide a *Hamelia patens* extract concentrate that can be used to conveniently provide finished topical medicaments by combination with other materials, as desired. Such at least one other material in some embodiments comprises a material selected from the group consisting of: silicates, aluminosilicates and silica present in effective flow-enhancing amounts to enable the *Hamelia patens* extract to flow freely when poured. In other embodiments, a *Hamelia patens* extract according to the disclosure is combined with a solvent, to provide a solution that comprises a *Hamelia patens* extract concentrate, in which *Hamelia patens* extract is present in any amount between about 1% by weight based on the total weight of the concentrate, up to the saturation limit of the *Hamelia patens* extract in the solvent employed, at ambient conditions.

In some embodiments a *Hamelia patens* extract is combined with a glyceryl ester based oil that is either plant-derived or animal-derived, and in some embodiments with any pre-selected mixture of glyceryl ester based oils. Suitable exemplary glyceryl ester based oils include without limitation oils such as soybean oil, coconut oil, palm oil, palm kernel oil, corn oil, olive oil, sunflower oil, safflower oil, cottonseed oil, rape oil including Canadian oil low acid, almond oil, sesame oil, peanut oil, beef tallow, lard, emu oil, butterfat, and mixtures thereof in any selected proportion. A composition according to some embodiments of this disclosure includes a *Hamelia patens* extract in combination with a glyceryl ester oil (alternately mixtures including a plurality of such oils, each present in any proportion), wherein the *Hamelia patens* extract is present in any amount between 1.00% by weight to 85.00% by weight, based on the total weight of the composition, including all percentages by weight and ranges of percentages by weight therebetween. The presence of a fatty acid glyceryl ester oil as a vehicle in general may be capable of facilitating or assisting in trans-dermal passage of one or more component materials present in *Hamelia patens* extract into scar tissue itself, or tissue adjacent to a scar. A glyceryl ester oil can also in some embodiments be used in place of water, alcohol or a mixture of water and alcohol as described herein, as the solvent into which a *Hamelia patens* extract is initially made from the plant material, such glyceryl ester oil solvent being subsequently separated from the constituents of the *Hamelia patens* that were extracted, if desired, using conventional techniques as reduced pressure distillation, molecular distillation, chromatography, etc. Thus, instead of steeping, percolating, etc. *Hamelia patens* plant parts in a solvent of water, alcohol, or an alcohol-water mixture, any glyceryl ester oil including without limitation those listed above, can be employed as a solvent in the extraction process. Following extraction, the glyceryl ester oil laden with constituent materials of the *Hamelia patens* plant can be filtered and then used directly as an ingredient in a topical medicament composition according to some embodiments of the present invention.

In other embodiments, a *Hamelia patens* extract is combined with water and optionally instead with any water/alcohol mixture including those described above to provide a solubilized form of *Hamelia patens* extract useful to provide topical medicament compositions according to the disclosure for improving the appearance of a scar or effect its complete or near-complete replacement with normal skin tissue Compositions according to some embodiments of the disclosure include a *Hamelia patens* extract in combination with water, in alternate embodiments in combination with alcohol, in alternate embodiments in combination with water/alcohol mixtures, in alternate embodiments in combination with glyceryl ester oil(s) as solvent, and in these embodiments the amount of *Hamelia patens* extract (crystalline or otherwise) is present in any desired amount between 1.00% by weight and up to the solubility limit of the solvent selected, which can be as high as 85.00% by weight of *Hamelia patens* extract, based on the total weight of the composition, including all percentages by weight and ranges of percentages by weight therebetween. In different embodiments any C2 to C4 alcohol (including any mixtures thereof in any proportion) are used, as solvent, either mixed with water in any chosen proportion, or anhydrous or substantially anhydrous. Any vegetable oil or plant-derived glyceryl ester oil may also be used as a solvent for making an extract of *Hamelia patens* using the same techniques as for the use of water, alcohols, or water-alcohol mixtures.

In another exemplary embodiment, about a one-liter volume of cut *Hamelia patens* leaves are compressed and combined with about 125 ml of petrolatum, the mixture being heated to any temperature in the range of between about sixty (60) degrees Centigrade and about eighty (80) degrees Centigrade for about 10 minutes. This provides a hydrocarbon base containing *Hamelia patens* extract that is in some embodiments applied directly to human skin, and is alternately useful in preparing compositions according to other embodiments of this disclosure comprising other ingredients known to be used or useful in dermatologically-acceptable carriers. In some embodiment this petrolatum-borne extract is combined with effective amounts of one (and alternately any number more than one) of an anti-inflammatory, anti-oxidant, and/or anti-bacterial material to provide an enhanced *Hamelia patens* extract. Such a petrolatum-borne *Hamelia patens* extract is easy to handle enabling quick and ready blending with other materials. In other embodiments, a powdered crystalline *Hamelia patens* extract is combined with petrolatum and heated with agitation to provide a composition according to the disclosure wherein the extract of *Hamelia patens* is present in any amount between 1.00% by weight to 85.00% by weight, based on the total weight of the petrolatum-based composition, including all percentages by weight and ranges of percentages by weight therebetween.

In another embodiment, a liquid solution *Hamelia patens* extract, (for example prepared by combining *Hamelia patens* plant parts with a solvent and percolating at about 60 degrees Centigrade) wherein the solvent is a 90% water/10% ethanol (by volume) mixture is combined with any vegetable oil or any glycerol ester oil to provide a mixture that is heated with stirring sufficiently to simmer off the water and alcohol present (a rotary evaporator can be used), under ambient or reduced pressure, with or without a sweep of air or nitrogen, causing the *Hamelia patens* extract to be taken up into the oil. For such embodiments, the quantity of water/ethanol extract and oil used are selected to provide an amount of *Hamelia patens* extract present in the final composition in any amount between 1.00% by weight and 85.00% by weight, based on the total weight of the composition, including all percentages by weight and ranges of percentages by weight therebetween. In alternate embodiments, one begins with a crystalline *Hamelia patens* extract and dissolves it in water/ethanol mixture comprising about 10% ethanol by volume and once dissolved, this mixture is combined with any desired amount of oil, the water/ethanol present is subsequently removed to afford an oil-borne *Hamelia patens* extract.

Thus, the present disclosure in various embodiments provides compositions comprising a crystalline *Hamelia patens* extract in combination with at least one material selected from the group consisting of: water, water/alcohol mixtures, hydrocarbons (petrolatum) and ester-type fats or oils, wherein the *Hamelia patens* extract is present in any amount between 0.05% by weight to 85.00% by weight, based on the total weight of the composition, including all percentages by weight and ranges of percentages by weight therebetween.

Crystalline or liquid (including aqueous, non-aqueous, alcoholic, hydrocarbon-based, and oil-borne) *Hamelia patens* extracts as provided herein may be further refined to isolate or concentrate any one, or more than one, of the compounds present in *Hamelia patens* using methods or techniques generally known to those skilled in the art including without limitation solvent extraction based on acid/base properties of the constituents, distillation, steam distillation, molecular distillation, chromatography and other tools and methods known to organic chemists, such as bromination followed by separation, and subsequent de-bromination using zinc, for unsaturated materials.

A *Hamelia patens* extract provided according to some embodiments typically contains a plurality of the following compounds: alkaloids, 2-alpha-hydroxyursolic acid, apigenin-7-o-beta d-glucuronide, aricine, catequine, 19-alpha-hydroxy Asiatic acid, 24-methylenecycloartane-3ß-ol, 24-methylcycloart-24-en-3ß-ol, 2 E-3,7,11,15,19-pentamethyl-2-eicosane-1-ol, ephedrine, flavonones, 2'-5-5'-7-tetrahydroxy-7-o-rutinoside, isomaruquine, isopteropodine, maruquine, the methyl ester of maruquine, mitraphylline, narirutin, narirutin (2r), narirutin (2s), oxindole alkaloids, oxindole aricine, palmirine, pigenin-7-o-beta D-glucuronide, pomolic acid, pteropodine, rumberine, rosmarinic acid, rotundic acid, rumberine, rutin, seneciphylline, ß-sitosterol, secophyllin, stigmast-4-en-3-one, stigmast-4-en-3-6-dione, stigmasterol, tannins, tormentic acid, uncarine F, and ursolic acid. In some embodiments, all of these compounds are present in a *Hamelia patens* extract useful to improve the appearance of a scar or effect its complete or near-complete replacement with normal skin tissue.

A *Hamelia patens* extract as provided in some embodiments contains alkaloids. In some embodiments alkaloids are present in a composition useful according to the disclosure in any amount between about 0.05% and about 30.00% by weight based on the total weight of the composition, including all weight percents and ranges of weight percents therebetween. A *Hamelia patens* extract as provided in some embodiments contains apigenin-7-o-beta d-glucuronide. In some embodiments apigenin-7-o-beta d-glucuronide is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains aricine. In some embodiments aricine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains catequine. In some embodiments catequine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains 24-methylenecycloartane-3ß-ol. In some embodiments 24-methylenecycloartane-3ß-ol is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains 24-methylcycloart-24-en-3ß-ol. In some embodiments 24-methylcycloart-24-en-3ß-ol is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains 2 E-3,7,11,15,19-pentamethyl-2-eicosane-1-ol. In some embodiments 2 E-3,7,11,15,19-pentamethyl-2-eicosane-1-ol is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains ephedrine. In some embodiments ephedrine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains flavanones. In some embodiments flavanones are present in a composition useful according to the disclosure in any amount between about 0.05% and about 30.00% by weight based on the total weight of the composition, including all weight percents and ranges of weight percents therebetween. A *Hamelia patens* extract as provided in some embodiments contains 2'-5-5'-7-tetrahydroxy-7-o-rutinoside. In some embodiments 2'-5-5'-7-tetrahydroxy-7-o-rutinoside is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains 19-alpha-hydroxy asiatic acid. In some embodiments 19-alpha-hydroxy asiatic acid is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains isomaruquine. In some embodiments isomaruquine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains isopteropodine. In some embodiments isopteropodine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains maruquine. In some embodiments maruquine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains the methyl ester of maruquine. In some embodiments the methyl ester of maruquine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains mitraphylline. In some embodiments mitraphylline is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains narirutin. In some embodiments narirutin is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains narirutin (2r). In some embodiments narirutin (2r) is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains narirutin (2s). In some embodiments narirutin (2s) is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains oxindole alkaloids. In some embodiments oxindole alkaloids are present in a composition useful according to the disclosure in any amount between about 0.05% and about 30.00% by weight based on the total weight of the composition, including all weight percents and ranges of weight percents therebetween. A *Hamelia patens* extract as provided in some embodiments contains oxindole aricine. In some embodiments oxindole aricine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains palmirine. In some embodiments palmirine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains pigenin-7-o-beta D-glucuronide. In some embodiments pigenin-7-o-beta D-glucuronide is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains pomolic acid. In some embodiments pomolic acid is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains pteropodine. In some embodiments pteropodine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains rumberine. In some embodiments rumberine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains rosmarinic acid. In some embodiments rosmarinic acid is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains rotundic acid. In some embodiments rotundic acid is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains rumberine. In some embodiments rumberine is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains rutin. In some embodiments rutin is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains seneciphylline. In some embodiments seneciphylline is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains ß-sitosterol. In some embodiments ß-sitosterol is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains secophyllin. In some embodiments secophyllin is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains stigmast-4-en-3-3-dione. In some embodiments stigmast-4-en-3-3-dione is present in a composition useful according to the disclosure in any amount between about 0.01% and about 5.00% by weight based on the total weight of the composition, including all weight percents and ranges of weight percents therebetween. A *Hamelia patens* extract as provided in some embodiments contains stigmast-4-en-3-6-dione. In some embodiments stigmast-4-en-3-6-dione is present in a composition useful according to the disclosure in any amount between about 0.01% and about 5.00% by weight based on the total weight of the composition, including all weight percents and ranges of weight percents therebetween. A *Hamelia patens* extract as provided in some embodiments contains stigmasterol. In some embodiments stigmasterol is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains tannins. In some embodiments tannins are present in a composition useful according to the disclosure in any amount between about 0.05% and about 30.00% by weight based on the total weight of the composition, including all weight percents and ranges of weight percents therebetween. A *Hamelia patens* extract as provided in some embodiments contains tormentic acid. In some embodiments tormentic acid is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains uncarine F. In some embodiments uncarine F is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains ursolic acid. In some embodiments ursolic acid is present in a composition useful according to the disclosure in any amount between about 0.05% and about 30.00% by weight based on the total weight of the composition, including all weight percents and ranges of weight percents therebetween. A *Hamelia patens* extract as provided in some embodiments contains 2-alpha-hydroxy ursolic acid. In some embodiments 2-alpha-hydroxy ursolic acid is present in a composition useful according to the disclosure in any amount between about 0.05% and about 30.00% by weight based on the total weight of the composition, including all weight percents and ranges of weight percents therebetween. The term "about" when used herein, such as in "about 30.00%" is to be understood as also including the exact numerical value occurring immediately subsequent to the word "about", in the same context. For example, the recitation of "about 30.00%" and "about 0.05%" includes the exact value specified, in this instance exactly 30.00% and exactly 0.05%, respectively. In some embodiments, each of the component materials in the listing above, when present in a *Hamelia patens* extract, are present in amounts within the above-specified ranges independently with respect to the amounts of the other component materials present. By separating the various components using known methods, it is possible to arrive at a large number of combinations within the scope of this disclosure.

As concerns any one or more than one of the foregoing materials in said listing which are described as being acids, the present disclosure includes the presence of such materials in their neutralized or anionic forms, and in alternate embodiments their esterified forms condensed with any selected alcohol, polyol or any other suitable selected material having an alcohol function. For those component compounds in the listing having a carboxylic acid function, the present disclosure includes the presence of such materials in their anionic forms, including without limitation their alkali metal salts, alkaline earth salts, ammonium salts and substituted ammonium salts, the concentration of the anionic forms of such material(s) being present in a composition according to the disclosure in the amounts specified for the acid form of the material(s). In some embodiments the concentration ranges for components present in a composition according to the disclosure are applied based on the weight percent of the anionic form of the material. In some embodiments, the concentration ranges in a composition according to the disclosure are determined based on the weight percent of the salt, including the cation present. Likewise when basic substances are recited, the present disclosure includes the presence of such materials in their protonated forms, the concentration ranges of such materials being present in a composition according to the disclosure in the amounts specified above for the basic form. In some embodiments the concentration ranges for a composition according to the disclosure is determined based on the weight percent of the protonated form of the material present. In some embodiments, the concentration ranges for a composition according to the disclosure is determined based on the weight percent of the protonated form of the material and including its anion present for charge neutrality.

In some embodiments, all of the materials recited above are present in a composition useful according to the disclosure. In other embodiments any one or more than one of the materials in the above listing are independently omitted from the contents of a composition useful according to the disclosure, such as by refining a *Hamelia patens* extract (including a crystalline *Hamelia patens* extract) for the purpose of removal of one, or any number greater than one, of component materials in the above listing present in the extract using techniques known to those skilled in the art. In other embodiments any one or any number greater than one of such components present in the listing may be purified using techniques known to those of ordinary skill in the art. For example, to remove nitrogenous bases the extract material is put up into aqueous solution and made alkaline, and extraction done using CHCl$_3$ to remove amino compounds, the aqueous layer being subsequently re-acidified or neutralized. In some embodiments, ammonia is used to make the material alkaline for purposes of such extraction, which ammonia is subsequently removed after the extraction having been completed by blowing with nitrogen or distilling or heating under reduced pressure. In other embodiments an aqueous extract of *Hamelia patens* is made slightly acidic by addition of HCl, and extractions are done using ethyl acetate, ether, chloroform, and/or hexanes. Following extraction, the aqueous layer is subjected to reduced pressure and slight heating or a sweep of nitrogen or other inert gas to facilitate removal of the HCl. In such embodiments, fractions obtained may be further treated to selectively separate or remove component materials present, using techniques known in the art including without limitation such techniques as preparatory chromatography columns, fractional distillation under vacuo, molecular distillation, precipitation and filtration, etc. In further embodiments, any one or more than one of any of the above-named components in the listing are produced synthetically or are otherwise acquired or produced, and are subsequently blended with one another to provide a blend that comprises a synthetic *Hamelia patens* extract that is useful according to the disclosure, such components that are selected to be present each being individually present at levels within the ranges specified herein based on the total weight of the topical medicament produced using *Hamelia patens* extract.

An extract of the plant *Hamelia patens* according to some embodiments of the disclosure may thus comprise a crude (water-based, H2O/alcohol based, oil-based, or petrolatum based) *Hamelia patens* extract from which any one, or any combination including any number more than one of, the component materials set forth in the listing above are omitted or removed from said extract, the resulting extract being useful according to this disclosure. In some embodiments at least any chosen two of the component materials selected from the group consisting of the materials recited in the listing above remain or are present in a *Hamelia patens* extract useful according to this disclosure, the component materials being independently present at concentrations within any of the ranges specified above in such compositions or extracts. In some embodiments at least any chosen three of the component materials selected from the group consisting of the materials recited in the listing above remain or are present in a *Hamelia patens* extract useful for providing a composition useful according to this disclosure, the component materials being independently present at concentrations within the ranges specified above in such compositions or extracts. In some embodiments at least any chosen four of the component materials selected from the group consisting of the materials recited in the listing above remain or are present in a *Hamelia patens* extract useful according to this disclosure, the component materials being independently present at concentrations within the ranges specified above in such composition or extracts. In some embodiments at least any chosen five of the component materials selected from the group consisting of the materials recited in the listing above remain or are present in a *Hamelia patens* extract useful according to this disclosure, the component materials each being independently present at any concentration within the ranges specified above in such compositions or extracts.

This disclosure includes the use of *Hamelia patens* extracts from which any selected of the components in the listing above have been removed, and also *Hamelia patens* extracts comprising a plurality of the materials in the listing above which are produced by combining previously-isolated purified component materials from such listing. In some embodiments, all alkaloids are omitted or removed when providing a *Hamelia patens* extract useful according to the disclosure, the remaining components of the listing remaining present. In some embodiments, all 2-alpha-hydroxyursolic acid is omitted or removed when providing a *Hamelia patens* extract useful according to the disclosure, the remaining components of the listing remaining present. In some embodiments, all flavonones are omitted or removed when providing a *Hamelia patens* extract according to the disclosure, the remaining components of the listing remaining present. In some embodiments, all apigenin-7-o-beta d-glucuronide is omitted or removed when providing a *Hamelia patens* extract useful according to the disclosure, the remaining components of the listing remaining present. In some embodiments, all aricine is omitted or removed when providing a *Hamelia patens* extract useful according to the disclosure, the remaining components of the listing remaining present. In some embodiments, all catequine is omitted or removed when providing a *Hamelia patens* extract useful according to the disclosure, the remaining components of the listing remaining present. In some embodiments, all flavonones are omitted or removed when providing a *Hamelia patens* extract useful according to the disclosure, the remaining components of the listing remaining present. In some embodiments, all 19-alphahydroxy Asiatic acid is omitted or removed when providing a *Hamelia patens* extract useful according to the disclosure, the remaining components of the listing remaining present. In some embodiments, all 24-methylenecycloartane-3ß-ol is omitted or removed when providing a *Hamelia patens* extract useful according to the disclosure, the remaining components of the listing remaining present. In some embodiments, all 24-methylcycloart-24-en-3ß-ol is omitted or removed when providing a *Hamelia patens* extract useful according to the disclosure, the remaining components of the listing remaining present. In some embodiments, all 2 E-3,7,11,15,19-pentamethyl-2-eicosane-1-ol is omitted or removed when providing a *Hamelia patens* extract useful according to the disclosure, the remaining components of the listing remaining present. In some embodiments, all ephedrine is omitted or removed when providing a *Hamelia patens* extract useful according to the disclosure, the remaining components of the listing remaining present. In some embodiments, all 2'-5-5'-7-tetrahydroxy-7-o-rutinoside is omitted or removed when providing a *Hamelia patens* extract useful according to the disclosure, the remaining components of the listing remaining present. In some embodiments, all flavonones are omitted or removed when providing a *Hamelia patens* extract useful according to the disclosure, the remaining components of the listing remaining present. In some embodiments, all isomaruquine is omitted or removed when providing a *Hamelia patens* extract useful according to the disclosure, the remaining components of the listing remaining present. In some embodiments, all isopteropodine is omitted or removed when providing a *Hamelia patens* extract useful according to the disclosure, the remaining components of the listing remaining present. In some embodiments, all maruquine is omitted or removed when providing a *Hamelia patens* extract useful according to the disclosure, the remaining components of the listing remaining present. In some embodiments, all the methyl ester of maruquine is omitted or removed when providing a *Hamelia patens* extract useful according to the disclosure, the remaining components of the listing remaining present. In some embodiments, all mitraphylline is omitted or removed when providing a *Hamelia patens* extract according to the disclosure, the remaining components of the listing remaining present. In some embodiments, all narirutin is omitted or removed when providing a *Hamelia patens* extract useful according to the disclosure, the remaining components of the listing remaining present. In some embodiments, all narirutin (2r) is omitted or removed when providing a *Hamelia patens* extract useful according to the disclosure, the remaining components of the listing remaining present. In some embodiments, all narirutin (2s) is omitted or removed when providing a *Hamelia patens* extract useful according to the disclosure, the remaining components of the listing remaining present. In some embodiments, all oxindole alkaloids are omitted or removed when providing a *Hamelia patens* extract useful according to the disclosure, the remaining components of the listing remaining present. In some embodiments, all oxindole aricine is omitted or removed when providing a *Hamelia patens* extract useful according to the disclosure, the remaining components of the listing remaining present: In some embodiments, all palmirine is omitted or removed when providing a *Hamelia patens* extract useful according to the disclosure, the remaining components of the listing remaining present. In some embodiments, all pigenin-7-o-beta D-glucuronide is omitted or removed when providing a *Hamelia patens* extract useful according to the disclosure, the remaining components of the listing remaining present. In some embodiments, all pomolic acid is omitted or removed when providing a *Hamelia patens* extract useful according to the disclosure, the remaining components of the listing remaining present. In some embodiments, all pteropodine is omitted or removed when providing a *Hamelia patens* extract useful according to the disclosure, the remaining components of the listing remaining present. In some embodiments, all rumberine is omitted or removed when providing a *Hamelia patens* extract useful according to the disclosure, the remaining components of the listing remaining present. In some embodiments, all rosmarinic acid is omitted or removed when providing a *Hamelia patens* extract useful according to the disclosure, the remaining components of the listing remaining present. In some embodiments, all rotundic acid is omitted or removed when providing a *Hamelia patens* extract useful according to the disclosure, the remaining components of the listing remaining present. In some embodiments, all rutin is omitted or removed when providing a *Hamelia patens* extract useful according to the disclosure, the remaining components of the listing remaining present. In some embodiments, all seneciphylline is omitted or removed when providing a *Hamelia patens* extract useful according to the disclosure, the remaining components of the listing remaining present. In some embodiments, all ß-sitosterol is omitted or removed when providing a *Hamelia patens* extract useful according to the disclosure, the remaining components of the listing remaining present. In some embodiments, all secophyllin is omitted or removed when providing a *Hamelia patens* extract useful according to the disclosure, the remaining components of the listing remaining present. In some embodiments, all stigmast-4-en-3-3-dione is omitted or removed when providing a *Hamelia patens* extract useful according to the disclosure, the remaining components of the listing remaining present. In some embodiments, all stigmast-4-en-3-6-dione is omitted or removed when providing a *Hamelia patens* extract useful according to the disclosure, the remaining components of the listing remaining present. In some embodiments, all stigmasterol is omitted or removed when providing a *Hamelia patens* extract useful according to the disclosure, the remaining components of the listing remaining present. In some embodiments, all tannins are omitted or removed when providing a *Hamelia patens* extract useful according to the disclosure, the remaining components of the listing remaining present. In some embodiments, all tormentic acid is omitted or removed when providing a *Hamelia patens* extract useful according to the disclosure, the remaining components of the listing remaining present. In some embodiments, all uncarine F is omitted or removed when providing a *Hamelia patens* extract useful according to the disclosure, the remaining components of the listing remaining present. In some embodiments, all ursolic acid is omitted or removed when providing a *Hamelia patens* extract useful according to the disclosure, the remaining components of the listing remaining present. As a non-limiting example, in some embodiments, all flavones, all rutin, and ephedrine are removed or omitted, the remaining components of the listing remaining present in a *Hamelia patens* extract useful according to this disclosure; however, any one or combination including more than one material in the listing may be selected to be removed or omitted. A combination, including a *Hamelia patens* extract, according to the disclosure and useful in accordance with providing compositions according to some embodiments of this disclosure may thus contain any number between about one and about all of the foregoing materials in the listing, in any combination, each, when present, being independently present in any amount within the ranges specified above.

For some embodiments of the disclosure the *Hamelia patens* extract is present in combination with other materials, of which petrolatum is one non-limiting example. In some embodiments a *Hamelia patens* extract (including those described above which omit one or more than one materials from said listing) is present as a component of a mixture comprising a dermatologically-acceptable carrier, which in some different embodiments can comprise a lotion, skin crème, ointment, or salve, as desired. For these embodiments, the term "dermatologically-acceptable carrier" is used in its ordinary sense relative to the different embodiments herein, generally including dermatologically-acceptable, non-toxic diluents or vehicles useful in formulation of dermatological compositions for topical application to human skin. The term "serum" as used herein can mean any composition comprising *Hamelia patens* extract in combination with a dermatologically-acceptable carrier, regardless of the exact concentration of *Hamelia patens* extract present in such composition.

Dermatologically-acceptable carriers can include, without limitation, one or more than one material selected from the group consisting of buffering agents, solubilizing agents, stabilizing agents, liquids such as water, saline solution, glycerol and ethanol. Such carriers enable a dermatologically-acceptable composition to be formulated as liquids, gels, syrups, slurries, suspensions, emulsions, salves, crèmes, ointments and the like for topical application to a scar on human skin. A discussion of analogous pharmaceutically-acceptable carriers is available in Remington's Pharmaceutical Sciences (Mack Pub. Co., N.J. 1991), the general idea being the same insomuch as the topical medicament composition that is to be topically applied to human skin according to this disclosure does not cause any deleterious effects to the subject's skin and acts as a carrier for the *Hamelia patens* extract it contains.

Dermatologically-acceptable carriers include any and all compositions capable of functioning as carriers for *Hamelia patens* extract intended for topical application to human epidermal tissue ("skin") or skin areas having a scar to effect its complete or near-complete replacement with normal skin tissue, without undue toxicity, incompatibility, instability, allergic response, etc. Numerous examples of ingredients useful in providing dermatologically-acceptable carriers and compositions having dermatologically-acceptable carriers for delivering active agents to the skin are well-known in the art and include without limitation those disclosed in U.S. Pat. Nos. 5,709,868; 4,992,478; 4,820,508; 4,608,392; and 4,559,157, which are incorporated herein by reference thereto. Topical application and words of similar import used herein mean to apply or spread a composition onto the surface of skin. A topical medicament is a composition that is formulated to be administered to skin by topical application. Within the class of dermatologically-acceptable carriers are included water, water-based carriers, alcohols, alcohol-based carriers, oils, and oil-based carriers, mineral oil and petrolatum-based carriers chosen for their ability to dissolve or disperse components present in the *Hamelia patens* extract.

As used herein, "topical composition" means any composition containing an extract of *Hamelia patens* in combination with a dermatologically-acceptable carrier and any other optionally added ingredients known to be used or useful in compositions intended and suitable for application to human skin. Topical compositions useful in carrying out a method of this invention can include various materials, including moisturizers, anti-oxidants, humectants, defoliants, oils, waxes, emulsions, emulsifiers, chelating agents, buffering agents, preservatives, and various cosmetics.

Topical application of *Hamelia patens* extract is accomplished in some embodiments by providing a combination of *Hamelia patens* extract with a dermatologically-acceptable carrier in which compounds present in the *Hamelia patens* extract are soluble per se, or are effectively solubilized (e.g., as a solution, suspension, emulsion, or microemulsion), and contacting or applying such combinations to a scar present on human skin.

In some embodiments, relatively low concentrations of *Hamelia patens* extract or any of its selected components in a combination according to the disclosure may be employed for instances in which more frequent topical application to human skin is undertaken, as compared to the frequency of application to human skin of a composition according to the disclosure in which the *Hamelia patens* extract is present at a higher concentrations. In some embodiments a topical medicament composition comprising *Hamelia patens* extract in combination with a dermatologically-acceptable carrier is formulated to contain at least about 0.25% and up to about 25.00% by weight based on the total weight of the composition of *Hamelia patens* extract, and accordingly suitable carriers can be readily chosen which can solubilize or disperse the components of the *Hamelia patens* extract to any concentration in that range, including every hundredth percentage therebetween, and all ranges therebetween. In some embodiments, *Hamelia patens* extract is present in a topical composition according to the disclosure in any amount between about 0.01% to about 30.00% by weight based on the total weight of the topical composition, including all percentages and ranges of percentages therebetween. In some embodiments a topical composition according to the disclosure contains about 10% by weight total *Hamelia patens* extract.

While the carrier for extract of *Hamelia patens* can consist of or comprise a relatively simple solvent or dispersant such as oils, the carrier may comprise materials which aid in percutaneous delivery and penetration of one or more than one of the components of a *Hamelia patens* extract into dermal lipid layers. Many of such compositions are well-known in the art of transdermal drug administration, and can take the form of lotions, creams, ointments, salves, gels and solid compositions (e.g., stick-form preparations). Some typical compositions include lotions containing water and/or alcohols and emollients such as hydrocarbon oils and waxes, silicone oils, hyaluronic acid, vegetable, animal, marine, or marine animal fats or oils, glyceride derivatives, fatty acids or fatty acid esters or alcohols or alcohol ethers, lanolin and derivatives, polyhydric alcohols or esters, wax esters, sterols, phospholipids and other materials having like function, and also emulsifiers (nonionic, cationic or anionic), although some of the emollients inherently possess emulsifying properties. These same general ingredients can be formulated into a crème, a lotion, gels, or solid sticks by utilization of different proportions of the ingredients and/or by inclusion of thickening agents such as gums or other forms of hydrophilic particles or colloids. Such compositions are within the class of those comprising dermatologically-acceptable carriers. In some embodiments those most preferred for topical application to human skin are carriers which are fat-soluble, i.e., those which can penetrate human dermal layers or fluids present, and deliver components of *Hamelia patens* extract to tissue layers or matrix beneath a scar present on human skin. In alternate embodiments, a *Hamelia patens* extract according to the disclosure may be applied to human skin using a time-release patch, as are used in hormone delivery, nicotine patches, anti-acne patches, and the like. Crèmes, aqueous solutions, pastes, powders, etc. are all suitable delivery vehicles for an extract of *Hamelia patens* or one or more of its components to human skin.

Thus, a *Hamelia patens* extract of the present disclosure (which term includes crystalline and other extracts mentioned herein, synthetically-assembled or otherwise provided), and alternately any of its components in any number, combination, and quantity as earlier set forth may be present in a wide range of compositions suitable to be applied to human skin. In addition, a *Hamelia patens* extract according to the present disclosure may be present in combination with surfactants and materials which are conventionally recognized as being used in skin care products, in which the concentration of *Hamelia patens* extract ranges from about 1.00% to up to about 60.00% by weight based on the total weight of the composition, including all percentages and ranges of percentages therebetween.

Surfactants and other materials which can be used in combination with a *Hamelia patens* extract in forming topical compositions useful for beneficially revising a scar present on human skin include without limitation: amphoteric/zwitterionic surfactants; anionic surfactants; nonionic surfactants; cationic surfactants; and optional ingredients, including without limitation those described below.

Amphoteric surfactants suitable for inclusion in a topical composition according to this disclosure comprising a *Hamelia patens* extract or any one or more than one of its components independently present in any amount within the ranges specified above can broadly be described as surface active agents containing at least one anionic and one cationic group and can act as either acids or bases depending on pH. Some of these compounds are aliphatic derivatives of heterocyclic secondary and tertiary amines in which the aliphatic radical may be straight or branched and wherein one of the aliphatic substituents contains from about 6 to about 20, preferably 8 to 18, carbon atoms and at least one contains an anionic water-solubilizing group, e.g., carboxy, phosphonate, phosphate, sulfonate, sulfate.

Zwitterionic surfactants suitable for inclusion in a composition according to this disclosure comprising a *Hamelia patens* extract or any of its components independently present in any amount specified in the ranges above can be described as surface active agents having a positive and negative charge in the same molecule which molecule is zwitterionic at all pH's. Zwitterionic surfactants are exemplified by betaines and sultaines. The zwitterionic compounds generally contain a quaternary ammonium, quaternary phosphonium or a tertiary sulfonium moiety. The cationic atom in the quaternary compound can be part of a heterocyclic ring. In all of these compounds there is at least one aliphatic group, straight chain or branched, containing from about 6 to 20, preferably 8 to 18, carbon atoms and at least one aliphatic substituent containing an anionic water-solubilizing group, e.g., carboxy, sulfonate, sulfate, phosphate or phosphonate.

Examples of amphoteric and zwitterionic surfactants suitable for inclusion in a composition comprising a *Hamelia patens* extract or any of its components independently in any amount specified within the ranges above include the alkali metal, alkaline earth metal, ammonium or substituted ammonium salts of alkyl amphocarboxyglycinates and alkylamphocarboxypropionates, alkyl amphopropionates, alkyl monoacetate, alkyl diacetates, alkylamphoglycinates, and alkyl amphopropionates wherein alkyl represents an alkyl group having from 6 to about 20 carbon atoms. Other suitable surfactants include alkyliminomonoacetates, alkyliminoacetates, alkyliminopropionates, alkyliminidipropionates, and alkylamphopropylsulfonates having between 12 and 18 carbon atoms, alkyl betaines and alkylamidoalkylene betaines and alkyl sultaines and alkylamidoalkylenehydroxy sulfonates.

Anionic surfactants suitable for inclusion in a composition comprising a *Hamelia patens* extract or any of its components independently present in any amount specified in the ranges above are those surfactant compounds which contain a long chain hydrocarbon hydrophobic group in their molecular structure and a hydrophilic group, including salts such as carboxylate, sulfonate, sulfate or phosphate groups. The salts may be sodium, potassium, calcium, magnesium, barium, iron, ammonium and amine salts of such surfactants. Anionic surfactants include the alkali metal, ammonium and alkanol ammonium salts of organic sulfuric reaction products having in their molecular structure an alkyl, or alkaryl group containing from 8 to 22 carbon atoms and a sulfonic or sulfuric acid ester group. Examples of such anionic surfactants include water-soluble salts of alkyl benzene sulfonates having between 8 and 22 carbon atoms in the alkyl group, alkyl ether sulfates having between 8 and 22 carbon atoms in the alkyl group and 2 to 9 moles ethylene oxide in the ether group. Other anionic surfactants include alkylsulfosuccinates, alkyl ethersulfosuccinates, olefin sulfonates, alkyl sarcosinates, alkyl monoglyceride sulfates and ether sulfates, alkyl ether carboxylates, paraffinic sulfonates, mono and di-alkyl phosphate esters and ethoxylated derivatives, acyl methyl taurates, fatty acid soaps, collagen hydrosylate derivatives, sulfoacetates, acyl lactates, aryloxide disulfonates, sulfosucinamides, naphthalene-formaldehyde condensates and the like. Aryl groups generally include one and two rings, alkyl generally includes from 8 to 22 carbon atoms and the ether groups generally range from 1 to 9 moles of ethylene oxide (EO) and/or propylene oxide (PO), preferably EO. Specific anionic surfactants which may be selected include linear alkyl benzene sulfonates, including without limitation those such as decylbenzene sulfonate, undecylbenzene sulfonate, dodecylbenzene sulfonate, tridecylbenzene sulfonate, nonylbenzene sulfate and the sodium, potassium, ammonium, triethanol ammonium and isopropyl ammonium salts thereof.

Nonionic surfactants may also be present in a composition according to the disclosure comprising a *Hamelia patens* extract or any of its components independently present in any amount specified within the ranges above. The nonionic surfactant(s) may be any of the known nonionic surfactants which, as with other surfactants discussed herein, are generally selected on the basis of compatibility, effectiveness, and economy, and present in a composition according to the disclosure in effective amount to enhance wettability or permeability of human skin when topically applied thereto or to otherwise beneficially modify activity of components present in a combination provided herein. Examples of useful nonionic surfactants include without limitation condensates of ethylene oxide with a hydrophobic moiety which has an average hydrophilic lipolytic balance (HLB) between about 8 to about 16, and in some embodiments between about 10 and about 13. Non-ionic surfactants include the ethoxylated primary or secondary aliphatic alcohols having from about 8 to about 24 carbon atoms, in either straight or branch chain configuration, with from about 2 to about 40, and in some embodiments between about 2 and about 9 moles of ethylene oxide per mole of alcohol. Other suitable nonionic surfactants include the condensation products of from about 6 to about 12 carbon atoms alkyl phenols with about 3 to about 30, and preferably between about 5 to about 14 moles of ethylene oxide.

Many cationic surfactants are known in the art and most any cationic surfactant having at least one long chain alkyl group of about 10 to 24 carbon atoms is suitable for optional use as a component in a composition comprising a *Hamelia patens* extract according to the present disclosure.

Other optional ingredients or additives which may be used in combination with *Hamelia patens* extract in formulating compositions according to the present disclosure include pH adjusting chemicals, for example, lower alkanolamines such as monoethanolamine (MEA) and triethanolamine (TEA). Sodium hydroxide solutions may also be utilized as an alkaline pH adjusting agent, as well as any organic acids, mineral acids or other acids known for their ability to adjust pH. The pH adjusting chemicals function to neutralize acidic or basic materials that may be present. Mixtures of more than one pH adjusting chemical can also be utilized, as well as buffers.

Phase regulants are well known and may also be optionally present in a composition of the disclosure. These can be represented by lower aliphatic alcohols having from 2 to 6 carbon atoms and from 1 to 3 hydroxyl groups, ethers of diethylene glycol and lower aliphatic monoalcohols having from 1 to 4 carbon atoms and the like.

Other optional supplemental additives include stabilizing agents, antioxidants, uv-light inhibitors or absorbers, preservatives, buffers formulated to be at any selected pH level within 0.5 pH units of normal skin, polyacids, anti-biotics, and bacteriocides.

*Hamelia patens* extracts of the present disclosure are useful in providing compositions which contain materials typically known to and used by those skilled in the art of formulation as being useful in formulating skin-care compositions, shampoos and other products intended for topical application. For purposes of this disclosure, the words "materials typically known to and used by those skilled in the art of formulation" include any one, or any combination comprising more than one of the materials selected from the group consisting of: fatty acids, alkyl sulfates, ethanolamines, amine oxides, alkali carbonates, water, ethanol, isopropanol, pine oil, sodium chloride, sodium silicate, polymers, alcohol alkoxylates, zeolites, aloe, vitamins, emu oil, anti-oxidants, carotenoids, terpenoids, flavonoids, hormones, perborate salts, alkali sulfates, enzymes, hydrotropes, dyes, fragrances, preservatives, brighteners, builders, polyacrylates, essential oils, alkali hydroxides, ether sulfates, alkylphenol ethoxylates, fatty acid amides, alpha olefin sulfonates, paraffin sulfonates, betaines, chelating agents, tallowamine ethoxylates, polyetheramine ethoxylates, ethylene oxide/propylene oxide block copolymers, alcohol ethylene oxide/propylene oxide low foam surfactants, methyl ester sulfonates, alkyl polysaccharides, N-methyl glucamides, alkylated sulfonate diphenyl oxide, and water soluble alkylbenzene sulfonates or allyltoluene sulfonates.

In some embodiments, a *Hamelia patens* extract of the present disclosure may comprise a fatty acid soap together with other non-soap surfactants, such as mild synthetic surfactants. Moisturizers and/or emollients and polymeric skin feel and mildness aids including dimethicone can also be selected to be present. The compositions may further optionally include thickeners (e.g., magnesium aluminum silicate, CARBOPOL® polymers), conditioners, water soluble polymers (e.g., carboxymethyl cellulose), dyes, perfumes, and germicides.

In some embodiments, a salve, crème, ointment, emulsion, or lotion containing an extract of *Hamelia patens* according to the disclosure is applied topically to a scar on human skin with like gentle application as one would employ if using any other topical medicament. In some embodiments, a salve, crème, ointment, or lotion including a *Hamelia patens* extract according to the disclosure is applied once daily to a selected scar on human skin. In other embodiments, a salve, crème, ointment, or lotion including a *Hamelia patens* extract according to the disclosure is applied twice daily to a selected scar on human skin. In other embodiments, a salve, crème, ointment, or lotion including a *Hamelia patens* extract according to the disclosure is applied thrice daily to a selected scar on human skin. In other embodiments, a salve, crème, ointment, or lotion including a *Hamelia patens* extract according to the disclosure is applied four times daily to a selected scar on human skin. In other embodiments, a salve, crème, ointment, or lotion including a *Hamelia patens* extract according to the disclosure is applied more than four times daily, on an as-needed or as-desired basis to a selected scar on human skin. The foregoing treatment frequencies can be used with any topical composition containing *Hamelia patens* extract having the *Hamelia patens* extract present at any concentration level within the percentage ranges specified herein, with about 10% being a good amount. In general, a single daily application has efficacy for beneficially revising the appearance of a scar on human skin, while three times daily application is expected to work well in nearly all cases. In some embodiments, application more than four times daily provides no further benefit than does the four times daily application. Daily application b.i.d. twice per day, using a topical composition containing 10% by weight *Hamelia patens* extract has good efficacy for the use provided herein.

*Hamelia patens* extracts as provided herein, whether present in crystalline, amorphous, gummy or liquid form, including oil-based liquids, aqueous liquids or alcohol-water mixtures, and topical compositions, as described, are useful in combination with liposomes in a topical composition. Suitable liposomes include those recognized by those skilled in the art as being useful in combination with plant-derived extracts and components present therein as herein described to enhance delivery of such extracts or components into the dermal layers of a human subject. Liposomes include artificial microscopic vesicles consisting of an aqueous core present and enclosed within either one, or a plurality of phospholipid layers, which structured materials are useful to convey one or any combination including any number greater than one components present in *Hamelia patens* extract through the dermal layers when a composition of this disclosure includes liposomes in an effective amount.

*Hamelia patens* extracts as provided herein, whether present in crystalline form or liquid form, including oil-based liquids, aqueous liquids or alcohol-water mixtures, and topical compositions, as described, are useful in combination with nanoparticles in a topical composition. As used herein, a nanoparticle is any particulate form that is less than about one micrometer in at least one dimension, including particulate forms that are less than one micrometer in at least one dimension. Suitable nanoparticles include those recognized by those skilled in the art as being useful in combination with plant extracts and materials present in plant-derived extracts, and include without limitation such nanoparticles as: solid core nanoparticles, hollow core nanoparticles, lipid nanoparticles, polyethylene glycol ("PEG") nanoparticles, chitosan nanoparticles.

Below are set forth several examples of materials and methods useful in carrying out non-limiting exemplary embodiments of the invention. These examples are exemplary of various embodiments and not delimitive thereof, as physicians being those of ordinary skill in the art to whom this specification is directed for the most part, readily appreciate.

Example I

Petrolatum Extract of *Hamelia patens*

A one-liter volume of cut and cleaned leaves of *Hamelia patens* are compressed and combined with about 125 ml of petrolatum, the mixture being heated to about 65 degrees Centigrade for about 10 minutes. The leafy material is mechanically separated from the petrolatum, which is optionally filtered, to afford a petrolatum-borne extract of the plant *Hamelia patens*.

Example II

Aqueous Alcohol Extract of *Hamelia patens*

500 grams of ground *Hamelia patens* leaves are combined with 500 ml of a solvent mixture that contains 10% by volume of ethanol in water. The liquid is maintained at room temperature for 30 minutes with occasional stirring of the leaves and solvent. The resulting solution is centrifuged to remove solids and filtered to provide a liquid extract of *Hamelia patens* in solution.

Example III

Crystalline Extract of *Hamelia patens*

The liquid extract provided in Example II is placed in a vacuum still, heated to fifty degrees Centigrade, and subjected to reduced pressure of 300 torr with a slow sweep of nitrogen gas being admitted over the liquid to enhance removal of solvent, the pressure being maintained at 300 torr. Once the solvent has been removed, a crystalline extract of *Hamelia patens* remains. This extract is optionally purified via re-crystallization using an ethanol-water mixture.

Example IV

Topical Skin Lotion

Ten grams of re-crystallized crystalline extract provided in Example III were placed in a 150 ml beaker. Ninety five grams of Vaseline® moisture locking lotion (unfragranced) were subsequently added to the beaker, and the contents mixed by mechanical means until the extract was substantially evenly dispersed within the lotion to provide a lotion containing 10% of an extract of the plant *Hamelia patens*. The concentration of *Hamelia patens* extract in the lotion is optionally adjusted to any desired level less than 10% by addition of any selected further quantity of the neat lotion, with subsequent mechanical mixing until homogeneous.

Example V

Vitamin-Fortified Lotion

Forty five grams of the 10% lotion of example IV is placed in a 100 ml beaker and five grams of Vitamin E oil are added and the beaker contents mixed until at least substantially uniform to provide a Vitamin-fortified lotion.

Example VI

Lotion Concentrate

Fifty grams of recrystallized crystalline extract provided in Example III were placed in a 150 ml beaker. Fifty grams of VASELINE® moisture locking lotion (unfragranced) were subsequently added to the beaker, and the contents mixed by mechanical means until the extract was substantially evenly dispersed within the lotion to provide a lotion containing 50% of an extract of the plant *Hamelia patens*. This lotion may be used as a lotion concentrate suitable as a base stock from which other lotions may be produced, such as by simple dilution to any desired concentration.

Example VII

Salve Containing *Hamelia patens*

To 95 grams of a petrolatum-based extract of the plant *Hamelia patens* prepared according to example I, are added five grams of DMSO and 0.5 grams of soy lecithin. The mixture is blended until at least substantially uniform to provide a salve having enhanced transdermal mobility.

Example VIII

Oil in Water Emulsion

The following ingredients are blended together:

| | |
|---|---|
| fatty alcohols (50/50 mix C16 + C18) | 15 grams |
| mineral oil | 10 grams |
| petrolatum | 3 grams |
| PEG-15 (oleyl.cetyl alc.) | 5 grams |
| water | 67 grams |
| crystalline extract from example III | 7.5 grams |

The emulsion formed from combining the above materials is one non-limiting example of a serum that can be applied directly to human skin for beneficial revision of a scar on human skin.

Example IX

A topical composition described in Example IV, is modified to contain 5% of *Hamelia patens* extract by addition of further neat lotion. The 5% *Hamelia patens* lotion is suitable to be topically applied for beneficial revision of a scar on human skin.

Example X

A topical composition described in Example IV, modified to contain 3% of *Hamelia patens* extract by addition of further neat lotion. The 3% *Hamelia patens* lotion is suitable to be topically applied for beneficial revision of a scar on human skin.

Example XI

A topical composition described in Example IV, modified to contain 1% of *Hamelia patens* extract by addition of further neat lotion. The 1% *Hamelia patens* lotion is suitable to be topically applied for beneficial revision of a scar on human skin.

Example XII

A topical composition described in Example IV, is modified to contain 15% of *Hamelia patens* extract by addition of crystalline *Hamelia patens* extract. The 15% *Hamelia patens* lotion is suitable to be topically applied for beneficial revision of a scar on human skin.

Although some methods of the present invention have been mentioned in some embodiments as employing skin crème, lotion, salve, gel or other dermatologically-acceptable carrier containing *Hamelia patens* extract at a concentration of 10% by weight, other concentrations of *Hamelia patens* extract in a skin crème, lotion, salve, gel or other dermatologically-acceptable carrier are suitable for use according to this invention to achieve like results. Without limitation, any topical composition comprising a dermatologically-acceptable carrier in combination with *Hamelia patens* extract wherein the concentration of *Hamelia patens* extract in the topical composition is any concentration in the range of between 1.00% and 30.0%, including all hundredth percentage and ranges of percentages therebetween, is sufficient for causing beneficial revision of a scar on the skin of humans after just three weeks following its topical application. In some embodiments, any selected concentration of *Hamelia patens* extract in a dermatologically-acceptable carrier in the range of between 5.00% and 15.00%, including all percentages and ranges of percentages therebetween, are sufficient for causing beneficial revision of a scar on the skin of humans, within about four weeks time. However, concentrations of *Hamelia patens* extract in a topical medicament of this disclosure greater than 15.00% or 30.00% can be employed up to the practical limit of usage, which is about 50% by weight of the composition. The concentration of 10% appears to be sufficiently efficacious.

After reading this Specification, persons of ordinary skill in the art immediately recognize that it is a matter of routine to apply a topical composition containing *Hamelia patens* extract in combination with a dermatologically-acceptable carrier any number of times per day as desired or directed, and using any selected concentration of *Hamelia patens* extract stated herein in a topical composition, as such selections are routine in the field of topical dermal application.

According to some embodiments, a topical composition comprising *Hamelia patens* extract in combination with a dermatologically-acceptable carrier having any amount of *Hamelia patens* extract present between 1.00% and 20.00% by weight of the topical composition, including all percentages and ranges of percentages therebetween, can be applied to human skin for causing beneficial revision of a scar on the skin of humans. This can be once daily, twice daily, three times daily, four times daily, five times daily and six times daily, or as frequently as desired at the discretion of the user or their physician.

In some embodiments, a topical medicament containing *Hamelia patens* extract is applied to a scar at least twice per day. In other embodiments, a topical medicament containing *Hamelia patens* extract is applied to a scar at least three times per day. In other embodiments, a topical medicament containing *Hamelia patens* extract is applied to a scar at least four times per day. Applying a composition having any selected amount between 2.00% by weight of *Hamelia patens* extract and 25.00% by weight of *Hamelia patens* extract once per day, twice per day, three times per day, four times per day, or more frequently, for any time period of from one to 120 days are included within the realm of effective amounts and frequencies for causing beneficial revision of a scar on human skin. It is well within the skill level of the physicians who are persons of ordinary skill in this art to determine using only routine experimentation, what an effective amount and frequency are for beneficially revising a scar by topical application of *Hamelia patens* extract, since beneficial revision is an observable outcome, and since applying a topical composition is a simple act which even children routinely perform using sun tan lotions, etc. The physician or attendant needs only apply a topical composition provided herein, and observe the patients' scar over time to observe the beneficial changes in the appearance and physiology of a given scar.

As used herein, the words "scar revision" is given its ordinary meaning, which is the revision, change, or alteration of the physical appearance of a scar, or an area on human skin having scar tissue thereon. Beneficial scar revision means those scar revisions which result in an improvement of the visual appearance of a scar according to the claimed methods. In some embodiments within the meaning of beneficial scar revision are scar revisions which result in a decrease in the amount of total scar tissue present on an area of skin treated according to the methods herein, after use of such methods, as compared to the same scar tissue or area of skin on a human subject prior to use of the methods herein described.

Moreover, the present invention is suited for persons having a large surface area of their skin affected by scar tissue. In some embodiments the frequency of application of a dermatologically-acceptable *Hamelia patens* extract as described herein can be at least once daily for any selected time period of between two days and eight weeks. In other embodiments, a topical composition provided herein is applied twice daily, once in the morning and once in the evening.

In some embodiments, causing beneficial revision of a scar is accomplished by twice-daily application of any topical composition herein provided comprising *Hamelia patens* extract containing any amount between 5.00% and 15.00% by weight of crystalline *Hamelia patens* extract according to Example III, in a dermatologically-acceptable carrier. However, other embodiments include applying a topical composition provided herein three and four times daily, at the discretion of the user or Physician. Application frequency and *Hamelia* extract content within these ranges are effective amounts and frequencies of application for causing beneficial revision of a scar, as herein described.

Beneficial Scar Revision—Old Surgical Scar

A 61 year-old male Caucasian subject with a fifteen centimeter long and 2 centimeter wide scar on his left forearm, from an operation relating to a compound fracture 45 years in the past, applied a composition containing 10% of *Hamelia patens* extract in a dermatologically-acceptable carrier to the scarred area once in the morning and once in the evening, for eight weeks. The scar comprised some contracture character and some hypertrophic character. After eight weeks the scar was visually noticeably reduced with regards to each of the characteristics mentioned. A cousin of the subject commented on the improved appearance of the scar, without being prompted to comment.

Beneficial Scar Revision—Third Degree Burn Scars

A thirteen year old male Caucasian subject suffered third degree burns over 90% of the surface area of his body's skin.

After five years of treatment in a recognized Burn Unit, he was discharged with four open and large escharotomy wounds colonized with *Staphylococcus aureus*. The scars contained those of hypertrophic, keloid, atrophic, and contracture character. Ten years later, a topical composition containing 10% by weight of *Hamelia patens* extract in a dermatologically-acceptable carrier was applied to one of the calf leg muscle area on one of the subjects' legs, twice daily for three weeks time. After three weeks, without question, the entire calf muscle area was definitely noticeably greatly improved in its appearance.

Beneficial Scar Revision—Third Degree Burn Scars

A seventy year old female Caucasian subject suffered a severe second-degree burn on her left forearm, from contact with a very hot iron. Such burns are well-known to always leave a noticeable scar even after normal healing. Upon initial presentation, the subject had a two-week old scar already on the site of the burn, having both atrophic and hypertrophic scars present. It had developed a secondary infection and drained the usual purulent material for a few days. The wound was about eight centimeters long and about one centimeter wide. A composition containing 10% by weight of *Hamelia patens* extract in a dermatologically-acceptable carrier was applied to the area two times daily for several weeks. In the photograph after the first week, the area pretty much looked the same as in the beginning. The photo of the second week however, showed a dramatic improvement, a definite reduction in the width of the affected area, with the length decreasing to about six centimeters, and the coloration distinction from surrounding tissue being much less than initial. The photo taken after one month, showed some amount of continued improvement in the appearance of the area. The photograph taken after five months of twice-daily application, revealed that it is barely noticeable that there ever was any injury to the area.

Beneficial Scar Revision—Scar from Parotid Surgery

A forty-four year old female Caucasian subject in her later 40's underwent an operation relating to a parotid gland, which left a highly unsightly scar from around the mylohyoid line, over the lower edge of the mandible and extending down the neck about seven centimeters, and having a width of about five millimeters. Twice-daily application of *Hamelia patens* extract at 10% by weight in a dermatologically-acceptable carrier, for six months ablated the entire scar to a degree no less than 95%, it is not noticeable except on very close-up inspection. Only a "before" and an "after" photograph were taken, and the difference is extremely striking since what was a large scar was seen to have all but literally disappeared.

In some embodiments, a composition provided containing 10% of *Hamelia patens* extract in a dermatologically-acceptable carrier contains a substance which gives a yellowish-green appearance when viewed under near ultraviolet light, of wavelength commonly sold as "black lights" to the consumer market. By viewing a scar or wound under this ultraviolet light, it is accordingly possible to see how the composition of this disclosure penetrates into a scar or wound. By observing a series of successive photographs of the 70-year old female subject mentioned above, it was seen that the active material of this disclosure penetrated and gathered in the more central regions of the burn, and that after about a month the amount visible under this ultraviolet light which penetrated towards the center, was less than during the early course of treatment. This was found to give an idea of the progression of the revision of normal healing by the present invention, not normally seen with the naked eye in ambient lighting conditions. It is theorized that the composition herein taught penetrates to the places where a certain, special type of healing is going on, and somehow alters the normal course of healing, so as to leave no scarring when otherwise scarring would have occurred. Accordingly, another aspect of the invention is in preventing scar formation by topically applying a composition provided containing *Hamelia patens* extract in a dermatologically-acceptable carrier to a fresh or recent wound which is otherwise expected to develop a scar in time. The concentrations and frequency of application can be the same as for treating extant scars for beneficial revision.

In some instances, slightly higher concentrations can be employed but 10% of *Hamelia patens* extract by weight is an effective amount even when topically applied to a scar once daily, although twice-daily and three-times daily are also effective. However, about 9% of *Hamelia patens* extract is also an effective amount, as are about 8%, about 7%, about 6%, about 5%, and about 4%, by weight in a dermatologically-acceptable carrier for the purpose of illustrating alternate effective amounts. Embodiments having less than about 3% of *Hamelia patens* extract by weight in a dermatologically-acceptable carrier have efficacy and are effective but not as preferred as are higher concentrations of the extract in the dermatologically-acceptable carrier.

The present disclosure includes subject matter defined by any combinations of any one (or more) of the features, elements, or aspects present described in reference to any embodiment described with one or more feature(s), element(s), or aspect(s) described in relation to any other one (or more) other embodiments described. These combinations include the incorporation of the features and/or aspect(s) of any dependent claim, singly or in combination with features and/or limitations of any one or more than one of the other dependent claims, with features and/or limitations of any one or more than one independent claim(s), with the remaining dependent claims in their original text being read and applied to any independent claim(s) so modified. These combinations also include combination of the features and/or limitations of one or more of the independent claims with features and/or limitations of another one or more than one of the independent claims to arrive at a modified independent claim, with the remaining dependent claims in their original text or alternately as modified per the foregoing, being read and applied to any independent claim(s) so modified.

The invention claimed is:

1. A method for beneficial revision of a scar present on the skin of a human subject, said method comprising:
   a) providing a topical composition containing a *Hamelia patens* extract in combination with a dermatologically-acceptable carrier; and
   b) contacting said composition topically to said scar in an effective amount and frequency of application for causing beneficial revision of said scar.

2. A method according to claim 1 wherein said scar is any type of scar selected from the group consisting of: keloid scars, contracture scars, hypertrophic scars, and atrophic scars, and scars which comprise any of the foregoing scar types simultaneously present.

3. A method according to claim 2 wherein said, scar comprises both an atrophic scar and a hypertrophic scar simultaneously present at substantially the same area of the skin.

4. A method according to claim 1 wherein said *Hamelia patens* extract is present in said topical composition in any amount between about 0.10% and about 25.00% by weight based on the total weight of said topical composition, including every hundredth percentage therebetween.

5. A method according to claim 1 wherein said *Hamelia patens* extract is present in said topical composition in any amount between about 5.00% and about 15.00% by weight based on the total weight of said topical composition, including every hundredth percentage therebetween.

6. A method according to claim 2 wherein said *Hamelia patens* extract is present in said topical composition in any amount between 0.10% and 25.00% by weight based on the total weight of said topical composition, including every hundredth percentage therebetween.

7. A method according to claim 2 wherein said *Hamelia patens* extract is present in said topical composition in any amount between 5.00% and 15.00% by weight based on the total weight of said topical composition, including every hundredth percentage therebetween.

8. A method according to claim 2 wherein said topical composition is applied to said scar at any frequency selected from the group consisting of: once daily, twice daily, three times daily and four times daily.

9. A method according to claim 8 wherein said *Hamelia patens* extract is present in said topical composition in any amount between 5% and 15% by weight based on the total weight of said topical composition.

10. A method according to claim 1 wherein said *Hamelia patens* extract comprises a plurality of materials selected from the group consisting of: alkaloids, 2-alpha-hydroxyursolic acid, apigenin-7-o-beta d-glucuronide, aricine, catequine, 19-alphahydroxy Asiatic acid, 24-methylenecycloartane-3ß-ol, 24-methylcycloart-24-en-3ß-ol, 2 E-3,7,11,15, 19-pentamethyl-2-eicosane-1-ol, ephedrine, flavonones, 2'-5-5'-7-tetrahydroxy-7-o-rutinoside, isomaruquine, isopteropodine, maruquine, the methyl ester of maruquine, mitraphylline, narirutin, narirutin (2r), narirutin (2s), oxindole alkaloids, oxindole aricine, palmirine, pigenin-7-o-beta D-glucuronide, pomolic acid, pteropodine, rumberine, rosmarinic acid, rotundic acid, rumberine, rutin, seneciphylline, ß-sitosterol, secophyllin, stigmast-4-en-3-3-dione, stigmast-4-en-3-6-dione, stigmasterol, tannins, tormentic acid, uncarine F, and ursolic acid, and including any mixtures of any of the foregoing, and wherein said dermatologically-acceptable carrier is in any form selected from the group consisting of: a salves, a cream, an ointment, a gel, and a lotion.

11. A method according to claim 10 wherein said composition comprises all of said materials recited in said group of materials.

12. A method according to claim 10 wherein each of said materials of said group of materials that are selected to be present are each independently present in any amount between 0.05% by weight and 30% by weight based on the weight of the *Hamelia patens* extract present in said composition.

13. A method according to claim 2, wherein said dermatologically-acceptable carrier comprises an emulsion.

14. A method according to claim 2 wherein said dermatologically-acceptable carrier comprises any material selected from the group consisting of: water; saline solution, any C1 to C4 alcohol; any glyceryl ester oil; and any mineral oil, including any combinations of any of the foregoing.

15. A method according to claim 2 wherein said topical composition comprises a nanoparticle selected from the group consisting of: solid core nanoparticles, hollow core nanoparticles, lipid nanoparticles, polyethylene glycol nanoparticles, and chitosan nanoparticles, and including any mixtures of any of the foregoing.

16. A method according to claim 2 wherein said topical composition comprises a liposome.

17. A method according to claim 12 wherein said extract is selected from the group consisting of: an aqueous extract of *Hamelia patens*, a non-aqueous extract of *Hamelia patens*, an alcoholic extract of *Hamelia patens*, an aqueous-alcoholic extract of *Hamelia patens*, and any mixtures of the foregoing.

\* \* \* \* \*